United States Patent [19]

Telakowski

[11] Patent Number: 5,435,125
[45] Date of Patent: Jul. 25, 1995

[54] REDUNDANT ENGINE STARTING SYSTEM

[75] Inventor: Robert Telakowski, Fairlawn, N.J.

[73] Assignee: United Technologies Corporation, Hartford, Conn.

[21] Appl. No.: 260,966

[22] Filed: Jun. 15, 1994

[51] Int. Cl.⁶ .............................................. F02C 7/275
[52] U.S. Cl. ................... 60/39.142; 60/625; 74/6; 74/661
[58] Field of Search .............. 60/39.142, 625, 630, 60/698, 700, 701, 702, 716, 718; 74/6, 661

[56] References Cited

U.S. PATENT DOCUMENTS

| | | | |
|---|---|---|---|
| 3,951,008 | 4/1976 | Schneider et al. | 74/661 |
| 4,484,871 | 11/1984 | Adman et al. | 74/661 |
| 4,662,233 | 5/1987 | Mazzorana | 74/661 |
| 4,899,534 | 2/1990 | Sorenson | 60/39.142 |

Primary Examiner—Lois J. Casaregola
Attorney, Agent, or Firm—Malcolm J. Chisholm, Jr.

[57] ABSTRACT

A redundant engine starting system is disclosed that includes at least first and second sub-starters that rotate corresponding sub-starter output shafts affixed by a joining gear to rotate an engine starter shaft to start the engine. Each sub-starter includes a speed sensor for detecting rotational speed of the sub-starter, and a control valve to control rotational speed of the sub-starter. A system control intelligence interprets sensed rotational speeds of the sub-starters and commands the control valves, so that the control valve of an operative sub-starter is commanded to allow increased rotational speed of the sub-starter and therefore its corresponding output shaft whenever the system control intelligence interprets the sensed rotational speed of an inoperative sub-starter. In a preferred embodiment, the system is employed to start a gas turbine engine; the sub-starters are powered by compressed air supplied by sub-starter air ducts; the control valves are operatively disposed within the ducts; and the system control intelligence is an electronic engine control system affixed to the engine.

13 Claims, 4 Drawing Sheets

REDUNDANT ENGINE STARTING SYSTEM

TECHNICAL FIELD

The present invention relates to an engine starting system, and more particularly to a pneumatic starting system for gas turbine engines.

BACKGROUND OF THE INVENTION

As is well known in the art, gas turbine engines are started by rotation of their compressors to provide sufficient pressurized air to support combustion of fuel in burners of the engines. In a typical gas turbine engine starting sequence, a starter first rotates the compressor at a constantly increasing speed. Next, when rotation of the compressor has established adequate air flow through the engine, a fuel ignition system is turned on, and then fuel flows into the burners and is ignited by the ignition system. At this stage of the starting sequence, the force generated by the fuel combustion is inadequate to permit the engine to accelerate to a self-sustaining, or self-accelerating speed. Consequently, the starter must continue contributing torque to assist the engine in achieving a self-sustaining speed. After the engine accelerates beyond its self-sustaining speed and approaches its idle speed, the ignition system and the starter are cut out, and the engine continues on to its idle speed.

To achieve the shortest possible total starting time, or "optimal start time", the starter remains engaged for the longest possible time. That is because, after combustion of the fuel commences, the engine and starter are working together to furnish the torque necessary for engine acceleration. Consequently, to decrease total engine start times, modern gas turbine engine starters are designed to provide substantial surplus torque beyond a minimum torque level required for an engine start.

The most common starters utilized with gas turbine engines on modern "jet" aircraft are pneumatic starters (also referred to as "air-turbine" starters). Pneumatic starters include a control valve to admit compressed air into the starter. The air passes through one or more nozzles that direct the air onto a turbine rotor. Resulting rotation of the rotor drives a sequence of starter gears affixed to a starter output shaft that engages an engine starter shaft within the engine's accessory drive gear box. An overrunning clutch is affixed to the starter output shaft to functionally disconnect the starter upon completion of the starting sequence. The compressed air is supplied to the starter by way of starter air ducts, and originates from either a source exterior to the aircraft; from on board, stored compressed air; or, from bleed air fed from other on board engines that have already been started.

Consistent, reliable starter performance is critical to efficient operation of a modern aircraft. Any starter failure often results in prolonged grounding of an aircraft until the failed starter is repaired or replaced. Additionally, failure of a starter during a starting sequence may result in either a "hot" start, wherein ignited fuel produces exhaust gas temperatures in excess of allowable limits due to inadequate air flow, or a "hung" start, wherein the engine is ignited, but unable to accelerate. Both "hot" and "hung" starts will result in an unacceptable delay in engine start up, and may even damage an engine. Because known pneumatic starters do not include a redundant back-up system, any failure of the control valve, turbine rotor, or starter gears, etc. will result in total starter failure.

Accordingly, it is the general object of the present invention to provide a redundant engine starting system that overcomes the reliability problems of the prior art.

It is a more specific object to provide a redundant engine starting system that is capable of starting a gas turbine engine despite failure of some of the system's components.

It is another specific object to provide a redundant engine starting system that increases starter reliability while primarily using known starter components.

The above and other objects and advantages of this invention will become more readily apparent when the following description is read in conjunction with the accompanying drawings.

DISCLOSURE OF THE INVENTION

A redundant engine starting system is disclosed for starting a gas turbine engine. The system is utilized to accelerate rotation of the engine through a starting sequence that includes ignition of fuel in the engine's burners after rotation of the engine's compressor by the starter system has generated adequate air flow through the burners. The system continues to accelerate rotation of the engine through a self-accelerating rotational speed, until the engine achieves an acceptable idle speed.

In a preferred embodiment, the redundant engine starting system of the present invention comprises a first sub-starter in a parallel functional relationship with a second sub-starter; a joining gear affixed between the first and second sub-starters and an engine starter shaft in an accessory gear box of the gas turbine engine; and, a first sub-starter air duct in parallel relationship with a second sub-starter air duct, the sub-starter air ducts being in fluid communication with both a compressed air supply and the first and second sub-starters, so that compressed air passing through the sub-starter air ducts causes the first and second sub-starters to rotate the joining gear and affixed engine starter shaft. Each sub-starter includes a speed sensor for detecting the rotational speed of the sub-starter; an overrunning clutch for functionally disconnecting the sub-starter from the engine; and control valve means for controlling the flow and/or pressure of the compressed air supplied to the sub-starter. Each sub-starter is in communication with a system control intelligence, such as a common electronic engine control unit ("E.E.C.") that commands the control valve means in response to sensed speeds communicated from the speed sensors.

In use, the control valve means on each sub-starter are set so that an adequate supply of compressed air flows through the sub-starters to rotate a gas turbine engine through the starting sequence in an optimal start time. If one sub-starter becomes inoperative, its overrunning clutch functionally disconnects the sub-starter from the engine, and its speed sensor detects a resulting inappropriate speed. The inoperative sub-starter's speed sensor communicates the inoperative status to the system control intelligence which in response shuts down the control valve means on the inoperative starter while further opening the control valve means on the operative sub-starter, so that an adequate flow of compressed air is supplied to the operative sub-starter to rotate the gas turbine engine through the starting sequence, although in less than an optimal start time.

BEST MODE FOR CARRYING OUT THE INVENTION

Figure 4:
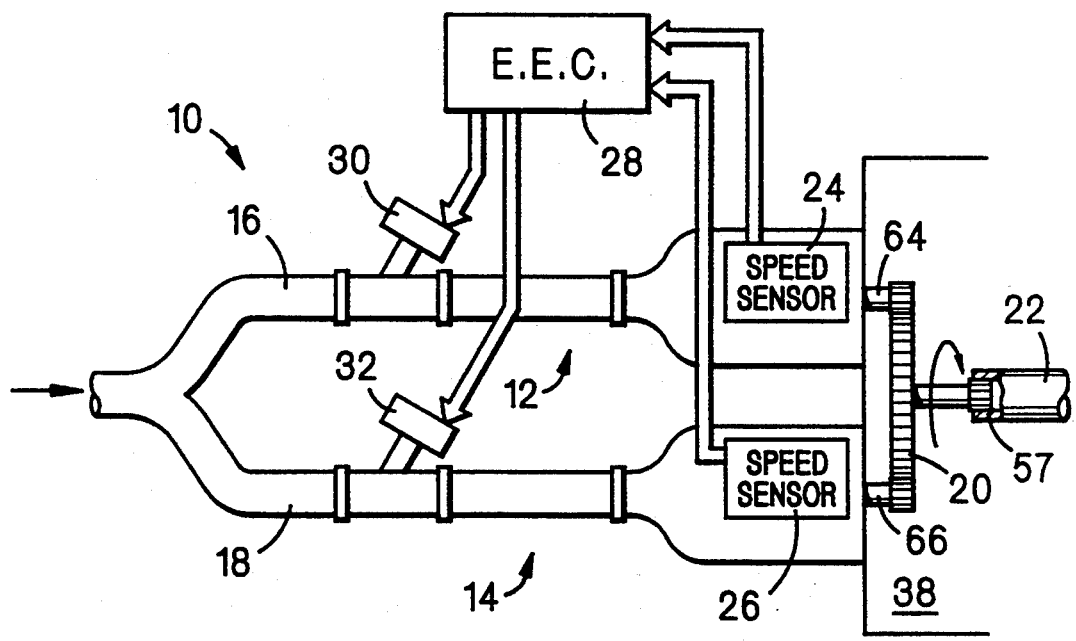
FIG. 4 is a schematic representation of a redundant engine starting system constructed in accordance with the present invention for starting gas turbine engines.
Figure 5:
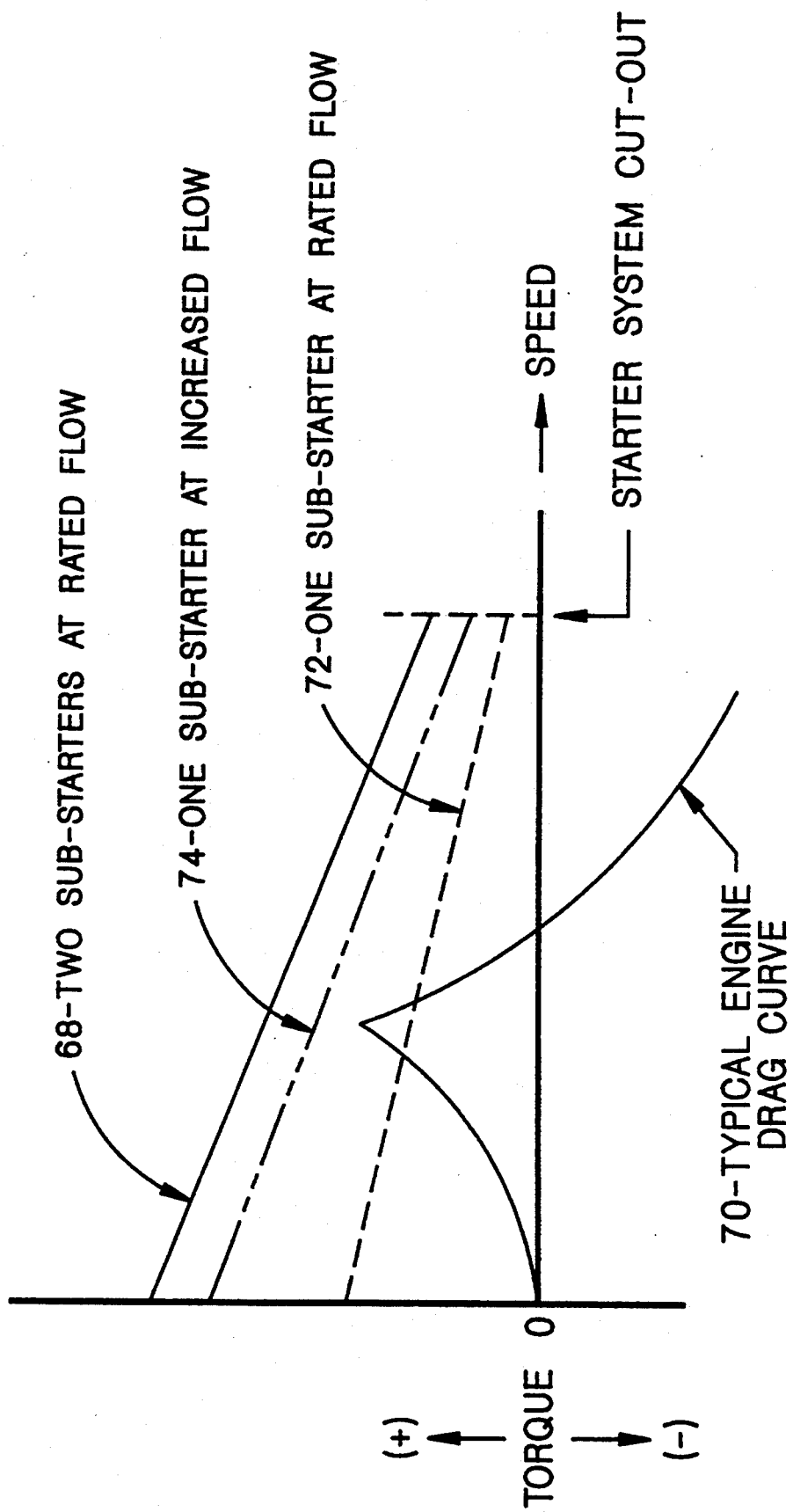
FIG. 5 is a graph showing torque and rotational speed characteristics of the redundant engine starting system of the present invention.

Referring to the drawings in detail, the preferred embodiment of a redundant engine starting system constructed in accordance with the present invention is shown and described in FIGS. 4 and 5 and is generally designated by the reference numeral 10. As best seen in FIG. 4, the system basically comprises a first sub-starter 12 in parallel functional relationship with a second sub-starter 14; a first sub-starter air duct 16 and second sub-starter air duct 18 that direct a supply of compressed air into the first and second sub-starters 12, 14 causing them to rotate a joining gear 20 affixed to an engine starter shaft 22; a first speed sensor 24 within the first sub-starter 12 and a second speed sensor 26 within the second sub-starter 14 that sense rotational speeds of the sub-starters; a system control intelligence means such as a main flight computer, or an electronic engine control ("E.E.C.") unit 28 of a type well-known in the art, that receives communications from the first and second speed sensors 24, 26 and controls a first control valve means 30 affixed to the first sub-starter 12, and a second control valve means 32 affixed to the second sub-starter 14.

Figure 1:
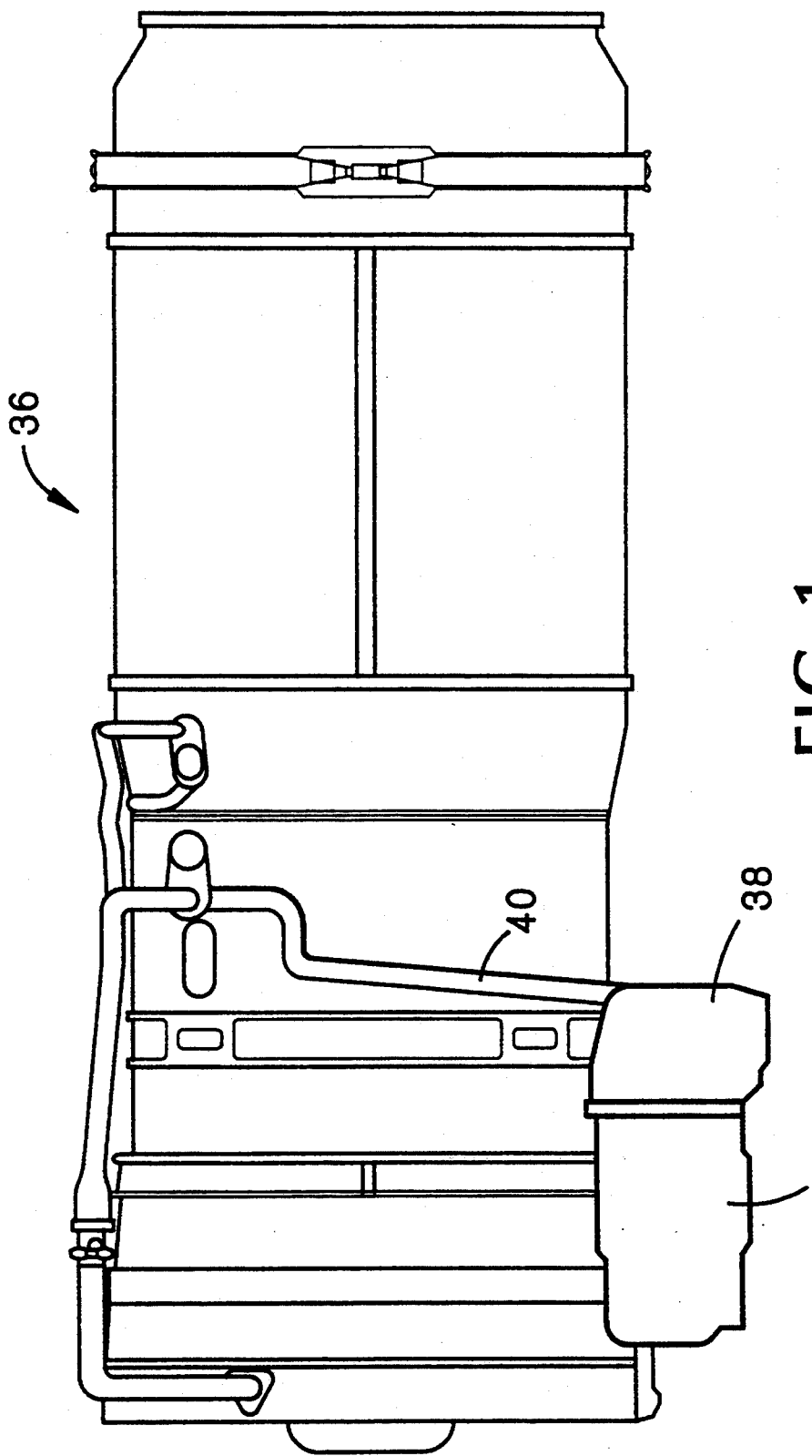
FIG. 1 is a side plan view of a prior art gas turbine engine showing an engine starting system affixed adjacent the engine's accessory drive gear box.

As shown in FIG. 1, a prior art starter 34 is shown affixed to a standard gas turbine engine 36 adjacent the engine's accessory drive gear box 38. Compressed air is supplied to the starter 34 through a main starter supply duct 40 from compressed air sources originating from either supplies exterior to an aircraft (not shown) housing the engine 36; from compressed air supplies stored on board the aircraft; or from bleed air supplied through the main starter supply duct 40 from other engines (not shown) on the aircraft that have already been started.

Figure 2:
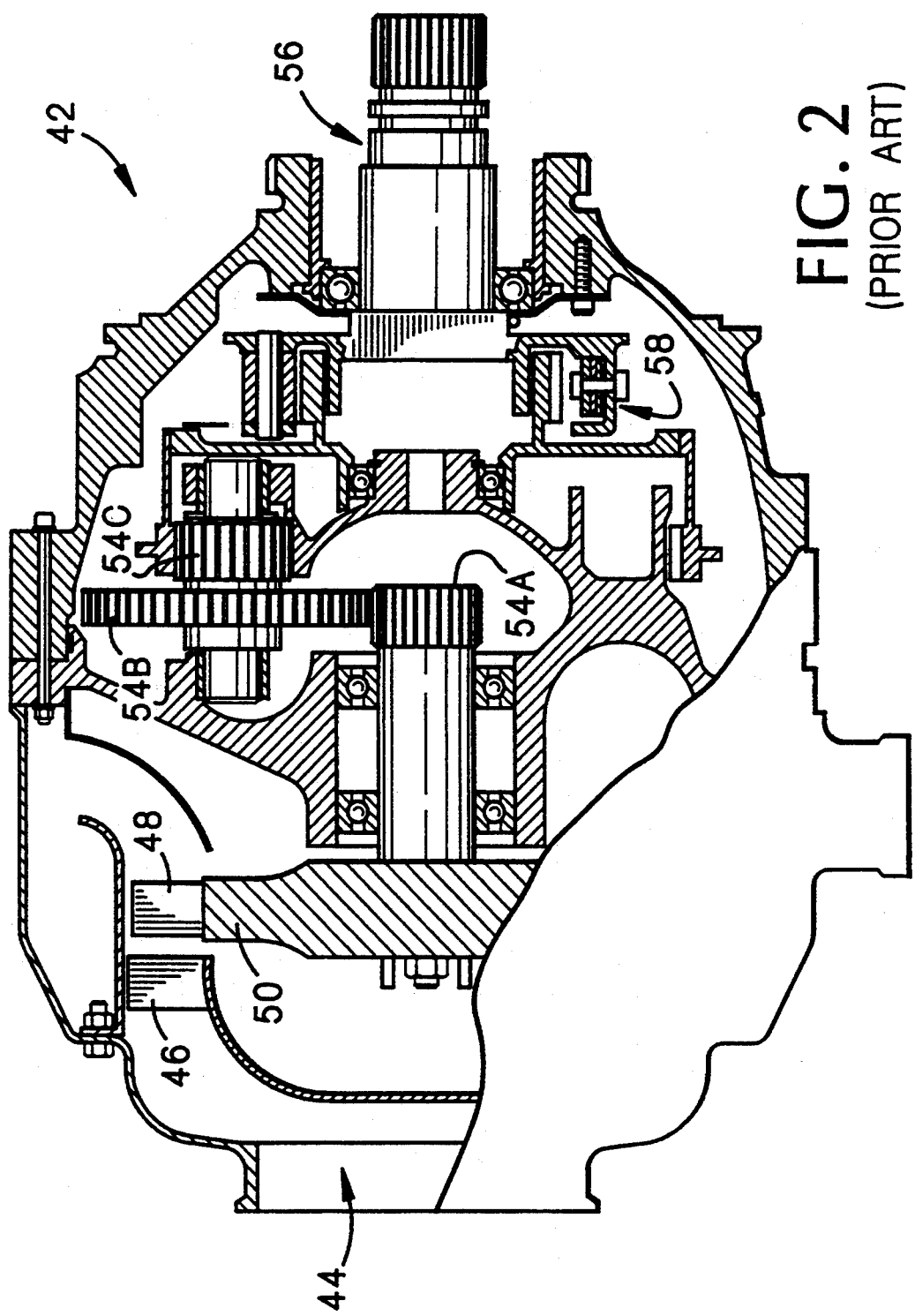
FIG. 2 is a fragmentary cross-sectional view of a prior art pneumatic starter.

As best seen in FIG. 2, a standard pneumatic starter 42 well known if the art (also generally referred to as an "air- turbine" starter) includes a compressed air intake 44 that directs a flow of compressed air through at least one nozzle 46, onto a plurality of rotor blades, such as rotor blade 48, of a rotor 50. After passing over the rotor blades, the compressed air is discharged out of the starter 42. The rotor 50 extracts energy from the compressed air in the form of rotation which in turn rotates a plurality of starter gears 54A, 54B, and 54C that apply torque to a starter output shaft 56 through an overrunning clutch 58 of a type well known in the art. The overrunning clutch 58 operates to functionally disconnect the starter output shaft 56 from the starter gears 54A–C whenever the speed of the engine 36 starts to exceed the speed of the starter's output shaft 56. Typical examples of known overrunning clutches that achieve such a function are sprag, pawl and ratchet, and jaw types of clutches.

Figure 3:
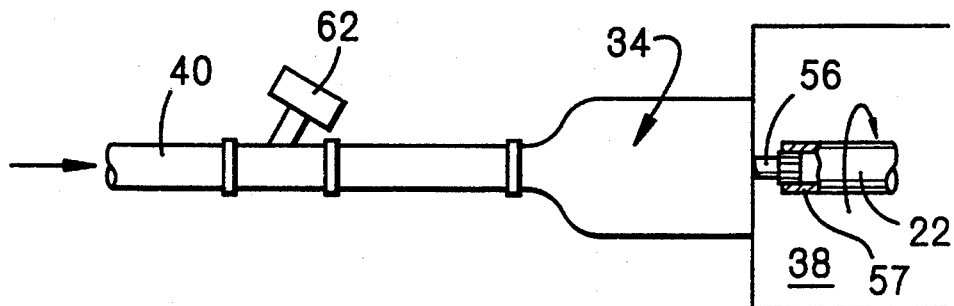
FIG. 3 is a schematic representation of a prior art starting system for starting gas turbine engines.

As shown in FIGS. 2 and 3, the output shaft 56 meshes with an output shaft receiving end 57 of the engine starter shaft 22 that is housed within the engine's accessory drive gear box 38, so that rotation of the engine starter shaft 22 causes a compressor (not shown) within the engine 36 to rotate. FIG. 3 also shows positioning of a prior art control valve means 62, such as a valve actuator, on the main starter supply duct 40 for regulating the flow of compressed air that passes through the rotor blades 48 of the rotor 50. Standard forms of prior art control valve means well known in the art include a pressure regulating valve (not shown), or an "on/off" valve (not shown) to regulate the pressure and/or supply of compressed air, which valves may be of standard types, such as butterfly, in-line, or ball valves. An additional form of increasing the power extraction from an operating starter is through use of a control valve means in the form a partial admission unit configuration (not shown) which is well known in the art. The partial admission unit uses less than a full compliment of nozzle passages to supply compressed air to a rotor for normal operation, and uses a full compliment of nozzles for an increased power mode.

The redundant engine starting system 10 of the present invention is best shown in FIG. 4, wherein the first sub-starter 12 and second sub-starter 14 include in nearly identical form all of the components of the standard pneumatic starter 42, and utilize the joining gear 20 to transfer rotational energy from a first sub-starter output shaft 64 and a second sub-starter output shaft 66 to the engine starter shaft 22. Within the first and second sub-starters 12, 14, the redundant engine starting system 10 also includes first and second speed sensors 24, 26 of a type well known in turbine art to sense rotational speed of the sub-starters' respective rotors or starter gears (not shown). The sensors 24, 26 communicate the sensed speed to the E.E.C. 28 or system control intelligence means. As schematically shown in FIG. 4, the E.E.C. interprets the sensed speed from the sub-starters 12, 14 to communicate control signals to the first and second control valve means 30, 32.

Operation of the redundant engine starting system 10 accelerates rotation of a gas turbine engine 36 through a standard starting sequence that includes ignition of fuel in the engine's burners (not shown) after rotation of the engine's compressors (not shown) by the starting system 10 has generated adequate air flow through the burners. The system continues to accelerate rotation of the engine through a self-accelerating rotational speed, until the engine achieves an acceptable idle speed, at which point the redundant engine starting system is cut out. In the event either the first or second sub-starter 12 or 14 becomes inoperative for any reason so that its sub-starter output shaft 64 or 66 is unable to accelerate its rotation, a first or second overrunning clutch (not shown) of the inoperative sub-starter functionally disconnects that sub-starter from the joining gear 20. The speed sensor of the inoperative sub-starter then communicates to the E.E.C. unit 28 a rotational speed of the rotor or starter gears (not shown) of the inoperative starter that is inconsistent with the speed of the rotor or starter gears of the operating sub-starter. The E.E.C. unit 28 then commands the control valve means of the inoperative sub-starter to interrupt flow of compressed air into the inoperative sub-starter, so that the compressed air previously going to the inoperative starter is immediately available for the operating sub-starter.

In the event the first and second control valve means 30, 32 are "on-off" valves, no further change in the "on-off" valve of the operating sub-starter would be necessary, because the increase flow of compressed air into that sub-starter would increase the torque applied to the engine starter shaft 22 by the sub-starter output shaft 64 or 66 of the operating sub-starter. In the event the first and second control valve means 30, 32 are pressure regulating valves or partial admission units, the E.E.C. unit commands the pressure regulating valve or partial admission unit of the operating sub-starter to admit a greater flow of compressed air onto the sub-starter's rotor (not shown) to increase the power applied to the engine starter shaft 22 by the sub-starter output shaft 64 or 66 of the operating sub-starter.

The FIG. 5 graph describes a configuration of the redundant starting system 10 that affords starting of a gas turbine engine in its optimal start time while utilizing a pair of substantially identical sub-starters, each of which is smaller, and requires less energy from a supply of compressed air, than a standard pneumatic starter necessary to start the engine in its optimal start time. In such a configuration, line 68 of the FIG. 5 graph defines the torque produced by the two sub-starters 12, 14 at a "rated flow" relative to the torque required to overcome a typical gas turbine engine's drag curve during a normal starting sequence, which drag curve is defined by line 70. "Rated flow" is the flow rate of compressed air into each sub-starter necessary to accelerate rotation of the gas turbine engine through the starting sequence at an optimal start time. Line 72 defines the torque produced by one sub-starter at rated flow. As is evident by the intersection of line 72 with line 70, one sub-starter at rated flow would not provide adequate torque to overcome the engine drag, and the start sequence could not be completed. However, when the E.E.C. unit 28 directs the first or second control valve means 30 or 32 to decrease the flow of compressed air to an inoperative sub-starter 12 or 14 and to increase the flow and/or pressure of compressed air to an operative sub-starter 12 or 14, the resulting increase in torque supplied by the operative sub-starter at an "increased flow" defined by line 74, surpasses the torque demands of the engine drag curve. The engine is therefore able to complete the starting sequence, although in a longer time than the optimal start time.

It should be understood by those skilled in the art that obvious structural modifications can be made without departing from the spirit of the invention. For example, the redundant engine starting system could be applied to systems utilizing a plurality of sub-starters, or to non-compressed air starting systems, wherein the control valve means is the electronic or hydraulic equivalent of a means for controlling rotational speed. Accordingly, reference should be made primarily to the accompanying claims rather than the foregoing specification to determine the scope of the invention.

Having thus described the invention, what is claimed is:

1. A redundant engine starting system for starting an engine, that comprises:
   a. a first sub-starter that rotates a first sub-starter output shaft;
   b. a second sub-starter that rotates a second sub-starter output shaft;
   c. a joining gear that operatively engages the first sub-starter output shaft and the second sub-starter output shaft to rotate an engine starter shaft of the engine to start the engine;
   d. a first speed sensor means affixed to the first sub-starter for sensing the rotational speed of the first sub-starter;
   e. a second speed sensor means affixed to the second sub-starter for sensing the rotational speed of the second sub-starter;
   f. a first control valve means for controlling the power of the first sub-starter;
   g. a second control valve means for controlling the power of the second sub-starter; and,
   h. a system control intelligence means for interpreting sensed rotational speeds of the first and second sub-starters and for commanding the first and second control valve means so that;
   the system control intelligence means commands the first control valve means to increase the power of the first sub-starter whenever the intelligence means interprets a sensed rotational speed of the second sub-starter as inconsistent with the sensed rotational speed of the first sub-starter; and,
   the system control intelligence means commands the second control valve means to increase the power of the second sub-starter whenever the intelligence means interprets a sensed rotational speed of the first sub-starter as inconsistent with the sensed rotational speed of the second sub-starter.

2. The redundant engine starting system of claim 1, wherein the first sub-starter includes a first overrunning clutch to disconnect the first sub-starter from the first sub-starter output shaft whenever rotational speed of the engine starter shaft exceeds the rotational speed of the first sub-starter, and the second sub-starter includes a second overrunning clutch to disconnect the second sub-starter from the second sub-starter output shaft whenever rotational speed of the engine starter shaft exceeds the rotational speed of the second sub-starter.

3. The redundant engine starting system of claim 1, wherein the engine is a gas turbine engine.

4. The redundant engine starting system of claim 3, wherein the system control intelligence means comprises an electronic engine control unit affixed to the gas turbine engine.

5. A redundant engine starting system for starting an engine, that comprises:
   a. a first sub-starter that receives a flow of compressed air from a first sub-starter air duct to rotate a first sub-starter output shaft;
   b. a second sub-starter that receives a flow of compressed air from a second sub-starter air duct to rotate a second sub-starter output shaft;
   c. a joining gear that operatively engages the first sub-starter output shaft and the second sub-starter output shaft to rotate an engine starter shaft of the engine to start the engine;
   d. a first speed sensor means affixed to the first sub-starter for sensing the rotational speed of the first sub-starter;
   e. a second speed sensor means affixed to the second sub-starter for sensing the rotational speed of the second sub-starter;
   f. a first control valve means operatively disposed within the first sub-starter air duct to control the flow of compressed air into the first sub-starter;

i. a second control valve means operatively disposed within the second sub-starter air duct to control the flow of compressed air into the second sub-starter; and h. a system control intelligence means for interpreting sensed rotational speeds of the first and second sub-starters and for commanding the first and second control valve means so that;

the system control intelligence means commands the first control valve means to increase the flow of compressed air into the first sub-starter whenever the intelligence means interprets a sensed rotational speed of the second sub-starter as inconsistent with the sensed rotational speed of the first sub-starter; and, the system control intelligence means commands the second control valve means to increase the flow of compressed air into the second sub-starter whenever the intelligence means interprets a sensed rotational speed of the first sub-starter as inconsistent with the sensed rotational speed of the second sub-starter.

6. The redundant engine starting system of claim 5, wherein the first sub-starter includes a first overrunning clutch to disconnect the first sub-starter from the first sub-starter output shaft whenever rotational speed of the engine starter shaft exceeds the rotational speed of the first sub-starter, and the second sub-starter includes a second overrunning clutch to disconnect the second sub-starter from the second sub-starter output shaft whenever rotational speed of the engine starter shaft exceeds the rotational speed of the second sub-starter.

7. The redundant engine starting system of claim 6, wherein the engine is a gas turbine engine.

8. The redundant engine starting system of claim 7, wherein the system control intelligence means comprises an electronic engine control unit affixed to the gas turbine engine.

9. A redundant engine starting system for starting an engine, that comprises:
  a. a plurality of sub-starters that rotate a corresponding plurality of sub-starter output shafts;
  b. a joining gear that operatively engages the plurality of sub-starter output shafts to rotate an engine starter shaft of the engine to start the engine;
  c. speed sensor means affixed to each sub-starter for sensing the rotational speeds of each sub-starter;
  d. control valve means affixed to each sub-starter for controlling torque applied by each sub-starter to each output shaft; and,
  e. a system control intelligence means for interpreting sensed rotational speeds of each sub-starter and for commanding the control valve means so that the torque applied by at least one operative sub-starter is increased whenever the intelligence means interprets a sensed rotational speed of an inoperative sub-starter as inconsistent with the sensed rotational speeds of the operative sub-starter.

10. The redundant engine control system of claim 9, wherein the plurality of sub-starters receive a flow of compressed air from sub-starter air ducts to rotate the sub-starter output shafts, and the control valve means are operatively disposed within the sub-starter air ducts.

11. The redundant engine starting system of claim 10, wherein each sub-starter includes an overrunning clutch to disconnect the sub-starter from its corresponding sub-starter output shaft whenever rotational speed of the engine starter shaft exceeds the rotational speed of sub-starter.

12. The redundant engine starting system of claim 11, wherein the engine is a gas turbine engine.

13. The redundant engine starting system of claim 12, wherein the system control intelligence means comprises an electronic engine control unit affixed to the gas turbine engine.

* * * * *